United States Patent
Drory et al.

(10) Patent No.: US 8,270,718 B2
(45) Date of Patent: Sep. 18, 2012

(54) MANIPULATING AN IMAGE BY APPLYING A DE-IDENTIFICATION PROCESS

(75) Inventors: Tal Drory, Haifa (IL); Amir Geva, Yokneam (IL); Sara Porat, Ramat Yishay (IL)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 12/235,608

(22) Filed: Sep. 23, 2008

(65) Prior Publication Data
US 2010/0074525 A1    Mar. 25, 2010

(51) Int. Cl.
*G06K 9/00* (2006.01)
(52) U.S. Cl. .......................... 382/181; 382/276
(58) Field of Classification Search .......... None
See application file for complete search history.

(56) References Cited

U.S. PATENT DOCUMENTS

| | | | |
|---|---|---|---|
| 2005/0111762 A1* | 5/2005 | Mathew et al. | 382/309 |
| 2007/0006316 A1 | 1/2007 | Veselova et al. | |
| 2007/0279672 A1 | 12/2007 | Harada | |

FOREIGN PATENT DOCUMENTS

JP    2000181988 A2    6/2000

OTHER PUBLICATIONS

James Z. Wang, "Security Filtering of Medical Images Using OCR", Digital Libraries: Advanced Methods and Technologies, Digital Collections, Proceedings of the Third All-Russian Scientific Conference, pp. 6 pages, Petrozavodsk, Russia, Sep. 2001.

* cited by examiner

*Primary Examiner* — Brian P Werner (57) ABSTRACT

A method for manipulating an image, the method includes: capturing image information representative of an image that includes images of textual characters; recognizing the textual characters by applying Optical Character Recognition; identifying the layout of the image; and applying at least one de-identification process on textual characters of interest to provide de-identification process results.

18 Claims, 6 Drawing Sheets

| 302 | 304 | 306 | 308 | 310 | 312 | 314 | 316 | 318 |
|---|---|---|---|---|---|---|---|---|
| Cust. id | first name | last name | g | address | city | phone num | email | insert date |
| 735127 | James | Bolton | M | 183 Park Ave. | Newton | 617-7529340 | jbolton@abc.us | 1995-03-16 |
| 570034 | Adam | Harvey | M | 1892 Highland Ave. | Newton | 617-4779204 | adamh@def.us | 1997-05-07 |
| 992404 | Gabriela | Rose | F | 632 Broadway St. | Waltham | 781-6692188 | grose@ghi.us | 1980-01-22 |
| 205236 | Todd | Flint | M | 82 Spruce Rd. | Brookline | 617-4308196 | todflint@xyz.us | 1984-04-27 |

320 Repeatable Scramble | Randomly Replace with Real Names (Lookup) 330 | Scramble; Preserve Format 340 | Scramble; Preserve Area Code 350 | Mask Local Part Only 360 | Random Replace 370

| Cust. id | first name | last name | g | address | city | phone num | email | insert date |
|---|---|---|---|---|---|---|---|---|
| 240126 | Martin | Poindexter | M | 370 Yooh Ave. | Newton | (617)3085840 | *******@abc.us | 2002-12-27 |
| 461537 | Nellie | Ngo | M | 1877 Pcbmkbzt Ave | Newton | 617-5111385 | *****@def.us | 1998-10-11 |
| 981908 | Monique | Belcher | F | 939 Ynkiecbv St. | Waltham | 781-4116286 | *****@ghi.us | 1995-07-21 |
| 910214 | Eli | Crain | M | 46 Xkedol Rd. | Brookline | 617-3025500 | *******@xyz.us | 1991-01-19 |

MANIPULATING AN IMAGE BY APPLYING A DE-IDENTIFICATION PROCESS

FIELD OF THE INVENTION

The present invention relates to methods, systems and computer program products for manipulating an image by applying a de-identification process.

BACKGROUND OF THE INVENTION

Organizations are facing many situations where they need to share data, internally or externally. This need is becoming more frequent with the increase in partnerships, cooperation, off-shoring and outsourcing. On the other hand, companies recognize the need to safeguard sensitive data and privacy of individuals, and to comply with emerging regulations and policies that are set out by governments and organizations to ensure that safety. Accordingly, data should be shared while preventing liabilities and indemnifications for data security breaches and ensuring compliance with the relevant regulations.

Data sharing can include sending images (for example, screens) to a remote user. For example, a service provider representative can see a screen that is originally generated by a remote site.

Different communication protocols can be used for communicating data, many user interface types and many regulations, and tailoring a data filtering (masking) process to each of these protocols can be time consuming and cumbersome.

There is a growing need to prevent unwanted exposure of information while facilitating remote execution of software applications.

SUMMARY OF THE PRESENT INVENTION

A method for manipulating an image, the method includes: capturing image information representative of an image that includes images of textual characters; recognizing the textual characters by applying Optical Character Recognition; identifying the layout of the image; and applying at least one de-identification process on textual characters of interest to provide de-identification process results.

The applying can include applying context based rules.

The method can include identifying associations between textual character strings.

The method can include applying a masking process on at least one textual character of interest and applying another de-identification process on at least one other textual character of interest.

The other de-identification process can be: repeatable scrambling; randomly replacing textual characters; scrambling textual characters; scrambling textual characters while preserving a format of textual character strings; scrambling at least one textual character of a textual character string while maintaining at least one textual character of the textual character string; and applying a random function.

The method can include applying a masking process on at least one textual character of interest, applying another de-identification process on at least one other textual character of interest, and applying a further de-identification process on at least one textual character of interest.

The image can be a synthetic image that is generated by application software.

The method can include executing the stages of capturing, identifying and applying in real time; generating modified image information representative of a modified image that comprises images of the de-identification process results instead of images of the textual characters of interest and transmitting the modified image to at least one target system.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

A method, system and a computer program product are provided. They manipulate an image by applying one or more de-identification processes.

Figure 1:
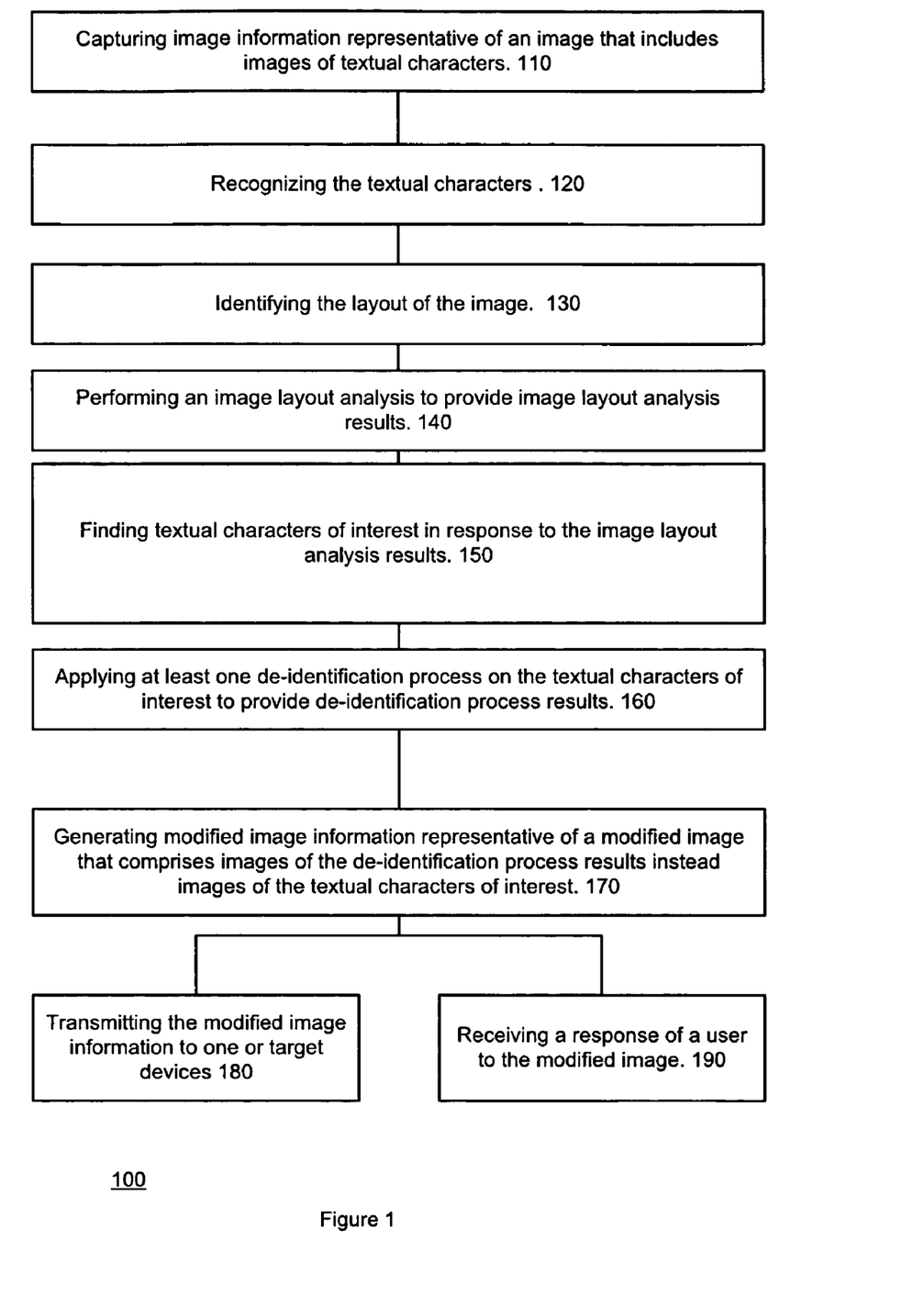
FIG. 1 illustrates a method according to an embodiment of the invention.

FIG. 1 illustrates method 100 for manipulating an image according to an embodiment of the invention.

Method 100 starts by stage 110 of capturing image information representative of an image that includes images of textual characters. The capturing can include obtaining pixel information, retrieving bitmaps, snooping or otherwise monitoring exchange of information that represent at least a portion of an image of a page, a form or another object that includes textual characters.

The image information can represent an image of one or more portions of a page, a form or another entity. These one or more portions can reflect a difference between a current image and a previous image.

Image information can be generated by or transmitted in a differential manner by a source system or by a delivery platform. Alternatively, a system that receives image information that represents an entire page, form or other entity, can determine the difference between a current image and a previous image.

This difference, and especially images of textual characters includes in this difference can be recognized using OCR technology and the processed.

The image is conveniently a synthetic image that is generated by application software such as a text editor, CRP application, form generation software, a service supporting application and the like. The synthetic image includes one or more pixels that are can be generated by application software. For example, a synthetic image should not include only unprocessed pixel information obtained by a camera.

The image can also be generated by scanning a tangible document such as a check, a medical image, a paper file, and the like.

Stage 110 can involve intercepting image information that is sent to one or more target systems by one or more source systems. The one or more target system can interact with the one or more source system via a gateway that modifies the image. Stage 110 can include intercepting image information that represents a difference between a previous image and a current image.

Stage 110 is followed by stage 120 of recognizing the textual characters by applying Optical Character Recognition. If stage 120 is applied only on textual characters that represent a difference between images then the time and resources required for completing this stage can be reduced and even dramatically reduced.

Stage 120 is followed by stage 130 of identifying the layout of the image. Stage 130 can include identifying associations between textual character strings. Stage 130 can involve performing an act that is analogues to reverse engineering GUI constructs like 'table', 'label of a text area' etc.

Stage 130 can include, for example, determining that a certain textual character string is a title of a row of a table, based upon the arrangement of various textual character strings and the location of that title in relation to other textual character strings.

Stage 130 is followed by stage 150 of applying at least one de-identification process on textual characters of interest to provide de-identification process results.

It is noted that each textual characters of interest can be subjected to one or more de-identification process.

Stage 150 can include applying context-based rules, content-based rules or a combination thereof. For example, a textual character of interest can be a social security number that can be masked if it is belongs to a column that is titled "social security number", "SSN" or an equivalent phrase.

Yet for another example, stage 150 can include masking a certain cell of a table or masking a textual characters of interest based upon an association between textual character strings.

Stage 150 can include applying a masking process on at least one textual character of interest and applying another de-identification process on at least one other textual character of interest. The other de-identification process can be either one of: (i) repeatable scrambling; (ii) randomly replacing textual characters; (iii) scrambling textual characters; (iv) scrambling textual characters while preserving a format of textual character strings; (v) scrambling at least one textual character of a textual character string while maintaining at least one textual character of the textual character string; and (vi) applying a random function.

Stage 150 can also include applying more than two different de-identification processes. For example, applying a masking process on a first group of textual characters of interest, applying another de-identification process on a second group of textual characters of interest, and applying a further de-identification process on a third group of textual characters of interest.

Stage 150 is followed by stage 170 of generating modified image information representative of a modified image that includes images of the de-identification process results instead of images of the textual characters of interest.

Stage 170 can include generating pixel information that when provided to a target system will cause the target system to display the modified image.

Stage 170 can be followed by at least one stage out of stage 180 of transmitting the modified image information to one or more target devices, and stage 190 of receiving a response of a user to the modified image. The response is sent to a source system. Accordingly, stages 180 and 190 can facilitate an interaction of a user with the modified image.

Method 100 can be executed in real time or near real time. It can facilitate a selective execution of applications by de-identifying sensitive information and allowing users or one or more target systems to execute applications. When method 100 is applied on image information that represents a difference between a previous image and a current image that amount of processed information can be decreased and even dramatically decreased and the speed of execution of method 100 can be reduced.

When method 100 is applied the users of one or more target systems can be unaware to the changes or otherwise not distracted by masked fields or sub-fields.

Figure 2:
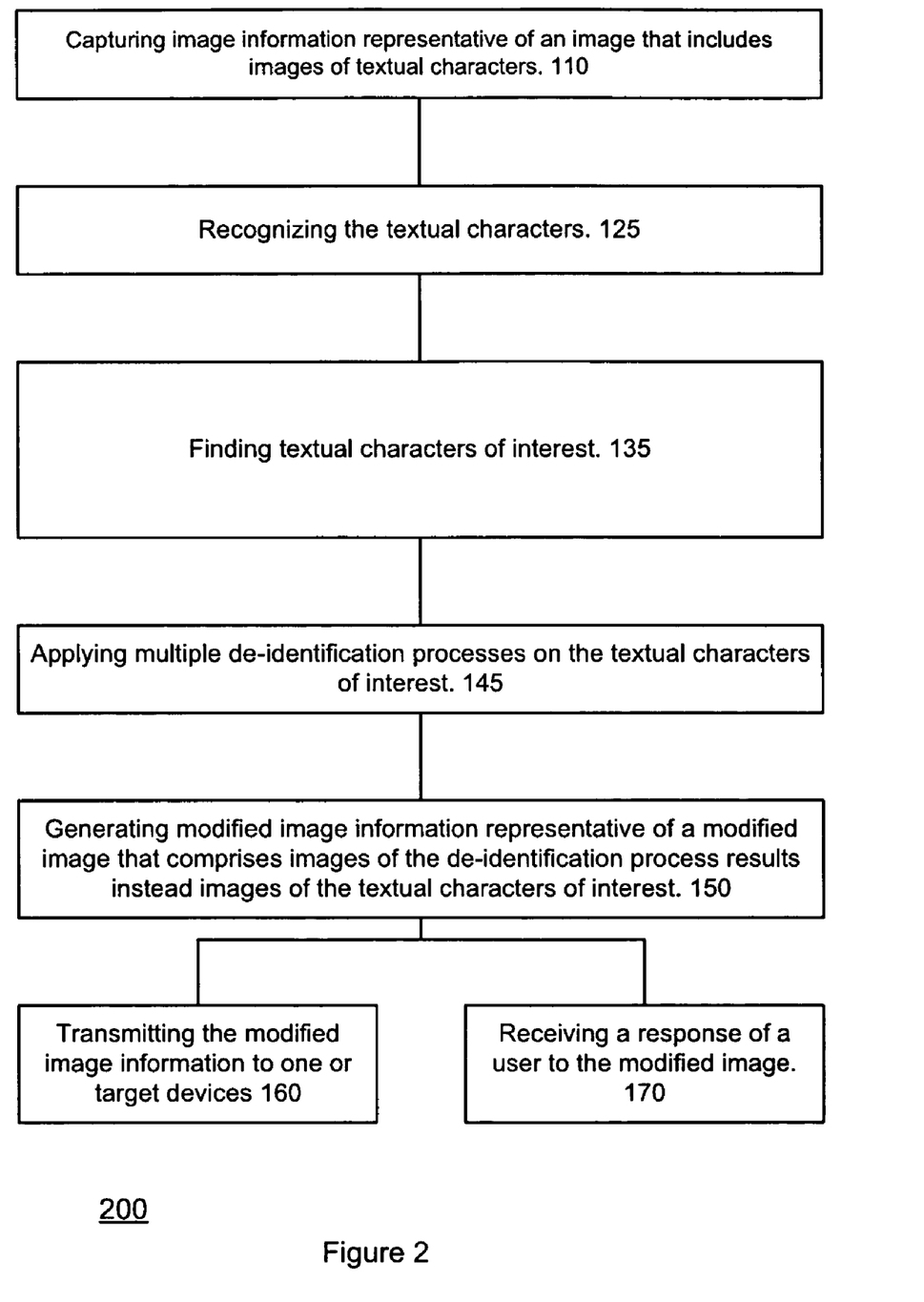
FIG. 2 illustrates a method according to an embodiment of the invention.

FIG. 2 illustrates method 200 for manipulating an image according to an embodiment of the invention.

Method 200 starts by stage 110 of capturing image information representative of an image that includes images of textual characters.

Stage 110 is followed by stage 125 of recognizing the textual characters.

Stage 125 is followed by stage 135 of finding textual characters of interest. Stage 135 can include executing stage 130 of method 100.

Stage 135 is followed by stage 145 of applying multiple de-identification processes on the textual characters of interest. Stage 145 can include applying one de-identification process on one or more textual characters of interest and applying another de-identification process on other one or more textual characters. Stage 145 can also include applying multiple de-identification processes on the same textual characters of interest.

Stage 145 is followed by stage 170 of generating modified image information representative of a modified image that includes images of the de-identification process results instead images of the textual characters of interest.

Stage 170 can include generating pixel information that when provided to a target system will cause the target system to display the modified image.

Stage 170 can be followed by at least one stage out of stage 180 of transmitting the modified image information to one or more target devices, and stage 180 of receiving a response of a user to the modified image. The response is sent to a target system. Accordingly, stages 180 and 190 can facilitate an interaction of a user with the modified image.

Performing layout analysis, and additionally or alternatively applying more than a single de-identification process can support a wide span of needs and requirements and can provide an easily configurable solution to multiple different software applications and different masking or de-identification requirements. When non-masking de-identification processes are applied, the users of the target systems can be unaware to the change or otherwise not distracted by masked fields or sub-fields.

Figure 3:
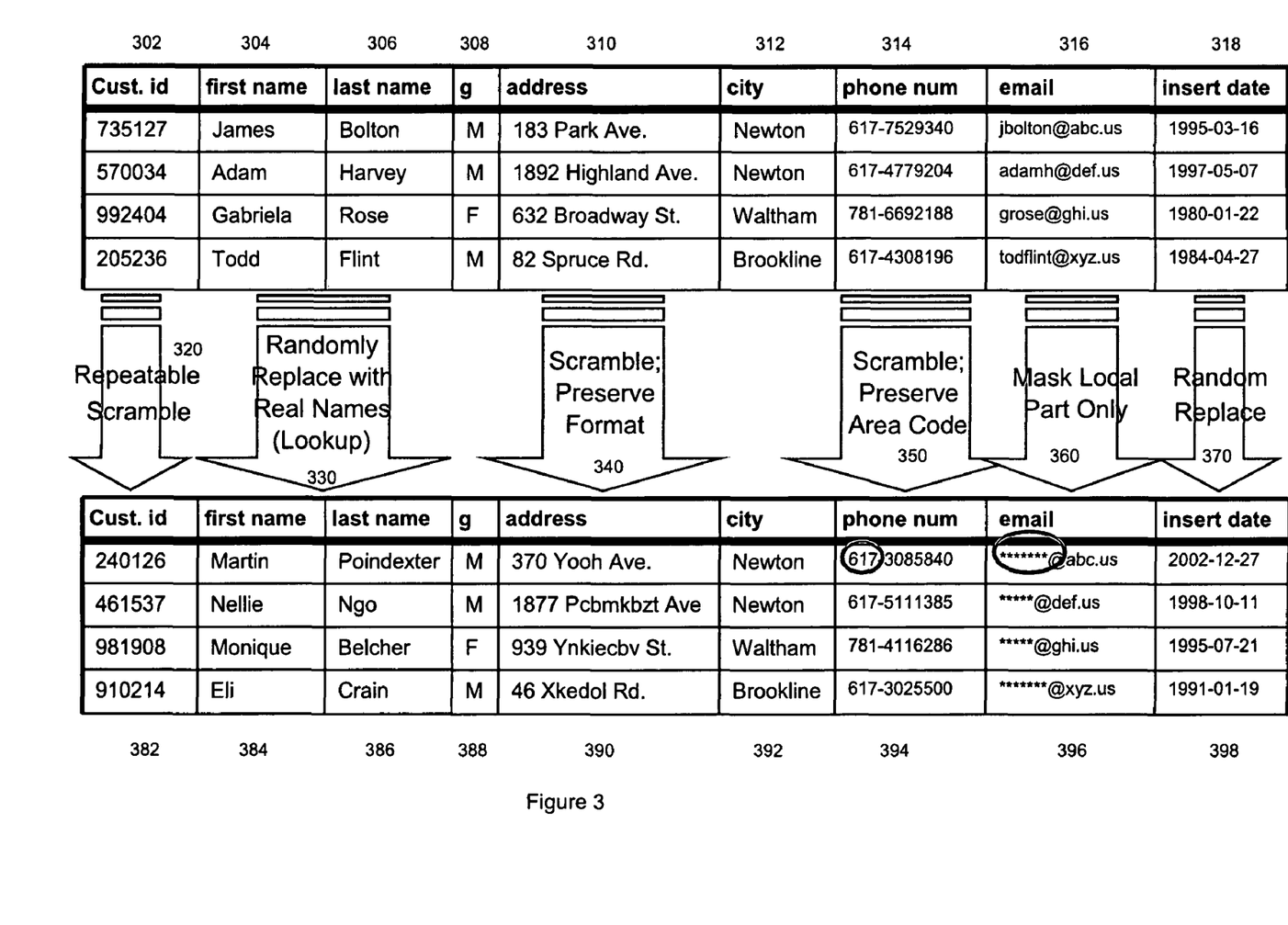
FIG. 3 illustrates multiple textual characters that undergo various de-identification stages, according to an embodiment of the invention.

FIG. 3 illustrates multiple textual characters that are arranged in columns 302, 304, 306, 308, 310, 312, 314, 316 and 318 undergo various de-identification stages 320, 330, 340, 350, 360 and 370 to provide de-identification process results 382, 384, 386, 388, 390, 392, 394, 396 and 398 according to an embodiment of the invention.

Image information representative of an image of a table is obtained by an OCR module. It includes customer identification ("customer id") column 302, first name column 304, last name column 306, gender column ("g") 308, address column 310, city column 312, phone number column 314 ("phone num"), email column 316, and insert date column 318.

A repeatable scrambling operation 320 is applied on customer identification column 302 to provide modified customer identification column 382. A random replacement with real names function is applied on first name column 304 and on last name column 306 to provide modified first name column 384 and modified last name column 386.

A scrambling operation that preserves format operation 340 is applied on address column 310 to provide modified address column 390. A scrambling operation that preserves area code operation 350 is applied on phone number column 314 to provide modified phone number column 394. A partial masking operation (on local part only) 360 is applied on email column 316 to provide modified email column 396. A random function is applied on insert date column 318 to provide modified insert date column 398.

All modified columns include modified textual characters that form de-identification process results.

A modified image generator can generate an image that includes images of these modified textual characters.

Figure 6:
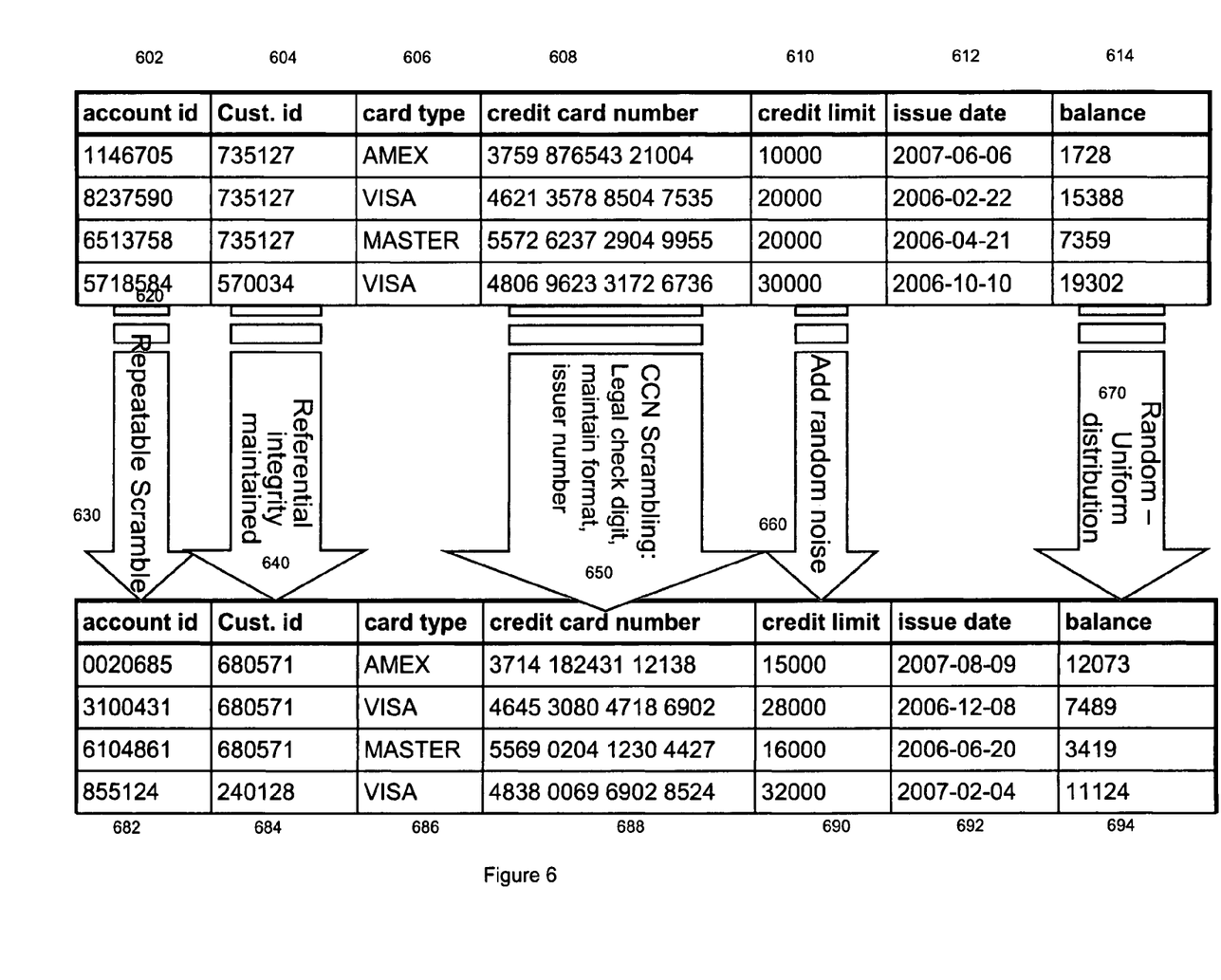
FIG. 6 illustrates multiple textual characters that undergo various de-identification stages, according to an embodiment of the invention.

FIG. 6 illustrates multiple textual characters that are arranged in columns 602, 604, 606, 608, 610, 612 and 614 undergo various de-identification stages 620, 630, 640, 650 and 660 to provide de-identification process results 682, 684, 686, 688, 690, 692 and 694 according to an embodiment of the invention.

Image information representative of an image of a table is obtained by an OCR module. It includes account identification ("account id") column 602, customer identifier column ("cust. Id") 604, card type column 606, credit card number column 608, credit limit column 610, issue date column 612 and balance 614.

A repeatable scrambling operation 620 is applied on account identification column 602 to provide modified account identification column 682. A transformation that maintains the referential integrity 630 is applied on customer identifier column 604 and to provide modified customer identifier column 684.

A CCN scrambling operation that preserves format operation 630 is applied on credit card column 608 to provide modified credit card column 688. An adding random noise operation 650 is applied on credit limit column 610 to provide modified credit liming column 690. A random operation that has a uniform distribution is applied on balance column 614 to provide modified balance 694.

All modified columns include modified textual characters that form de-identification process results.

Figure 4:
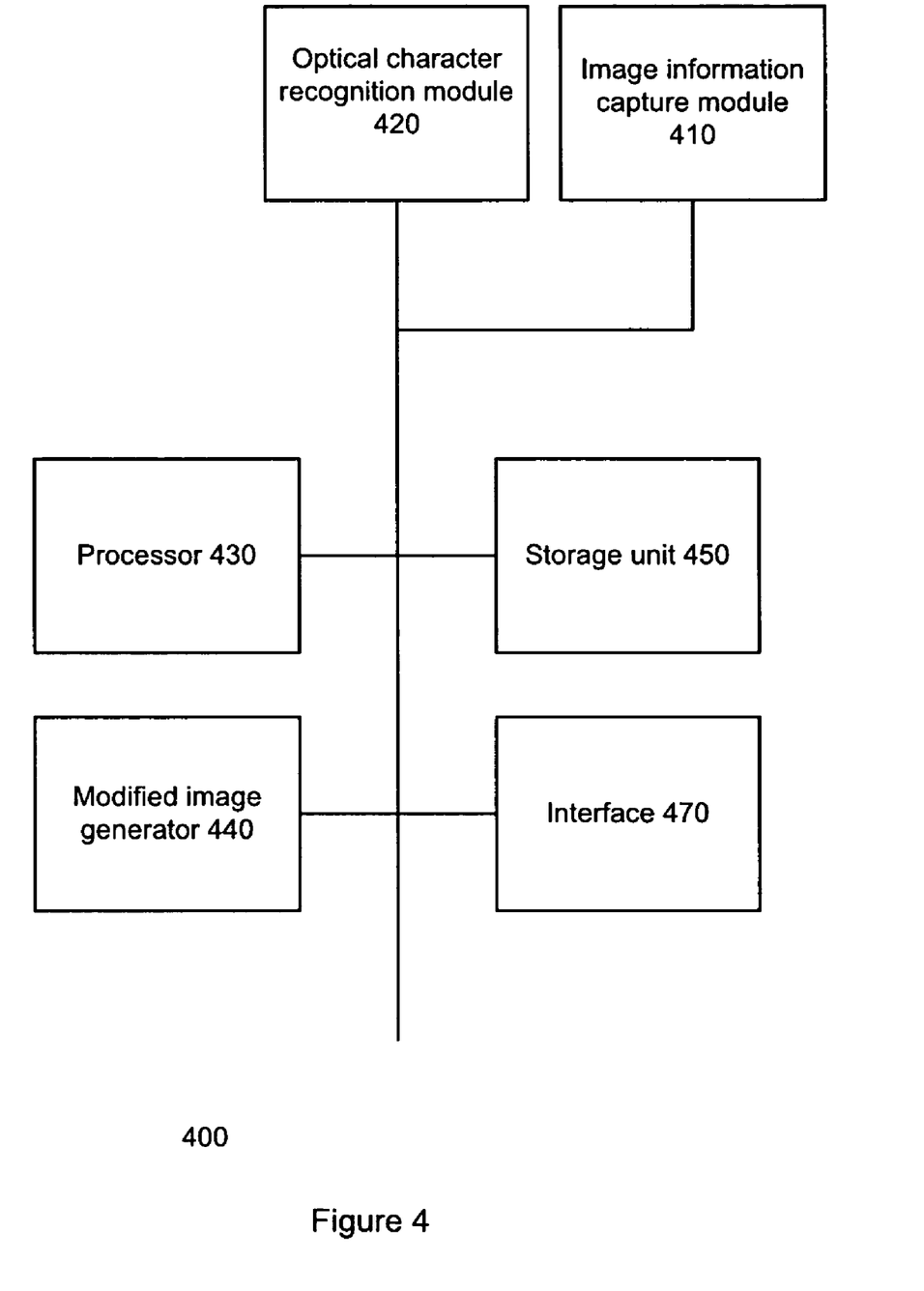
FIG. 4 illustrates a system according to an embodiment of the invention.

FIG. 4 illustrates system 400 according to an embodiment of the invention.

System 400 includes image information capture module 410, optical character recognition module 420, processor 430, modified image generator 440, storage unit 450 and input/output modules 460.

Image information capture module 410 is adapted to capture image information representative of an image that includes images of textual characters. The capturing can include obtaining pixel information, retrieving bitmaps, snooping or otherwise monitoring exchange of information that represent an image of a page, a form or another object that includes textual characters.

Optical character recognition (OCR) module 420 is adapted to recognize the textual characters.

OCR module 420 can be any prior art OCR module. It can be any of the following products or any other commercially available OCR modules: Expervision, TypeReader & RTK, ABBY, FineReader OCR, OmniPage, Readiris, PrimeOCR, Clara OCR, ReadSoft, Simple OCR, TextBridge, StreamText, and the like.

OCR module 420 can locate text areas (such as titles, labels, etc) and text fields. Shapes can be identified by a shape locating module.

Processor 430 is adapted to determine an image layout and apply a de-identification process on textual characters of interest to provide de-identification process results.

Additionally or alternatively, processor 430 is adapted to apply a masking process on at least one textual character of interest and apply at least one other de-identification process on at least one other textual character of interest to provide de-identification process results.

Processor 430 can apply at least one of the following de-identification processes: (i) masking, (ii) repeatable scrambling; (iii) randomly replacing textual characters; (iv) scrambling textual characters; (v) scrambling textual characters while preserving a format of textual character strings; (vi) scrambling at least one textual character of a textual character string while maintaining at least one textual character of the textual character string; and (vii) apply a random function. It is noted that the applying of randomly replacing textual characters or applying a random function can be referred to as applying a random operation.

Modified image generator 440 is adapted to generate modified image information that represents a modified image that includes images of the de-identification process results instead of images of the textual characters of interest.

Storage unit 450 can store at least one of the following: (i) image information, (ii) modified image information, (iii) context based rule that is used to apply a de-identification process on textual characters of interest (that may include sensitive information), (iv) content based rule that is used to apply a de-identification process on textual characters of interest (that may include sensitive information), and the like.

System 400 is not dependent on the application software that generates the screens, nor on the delivery mechanisms, and can thus practically work on all screen displays and User Interface applications.

System 400 can be implemented near the source systems, near the target system and can be located far away from both target systems and source systems.

Figure 5:
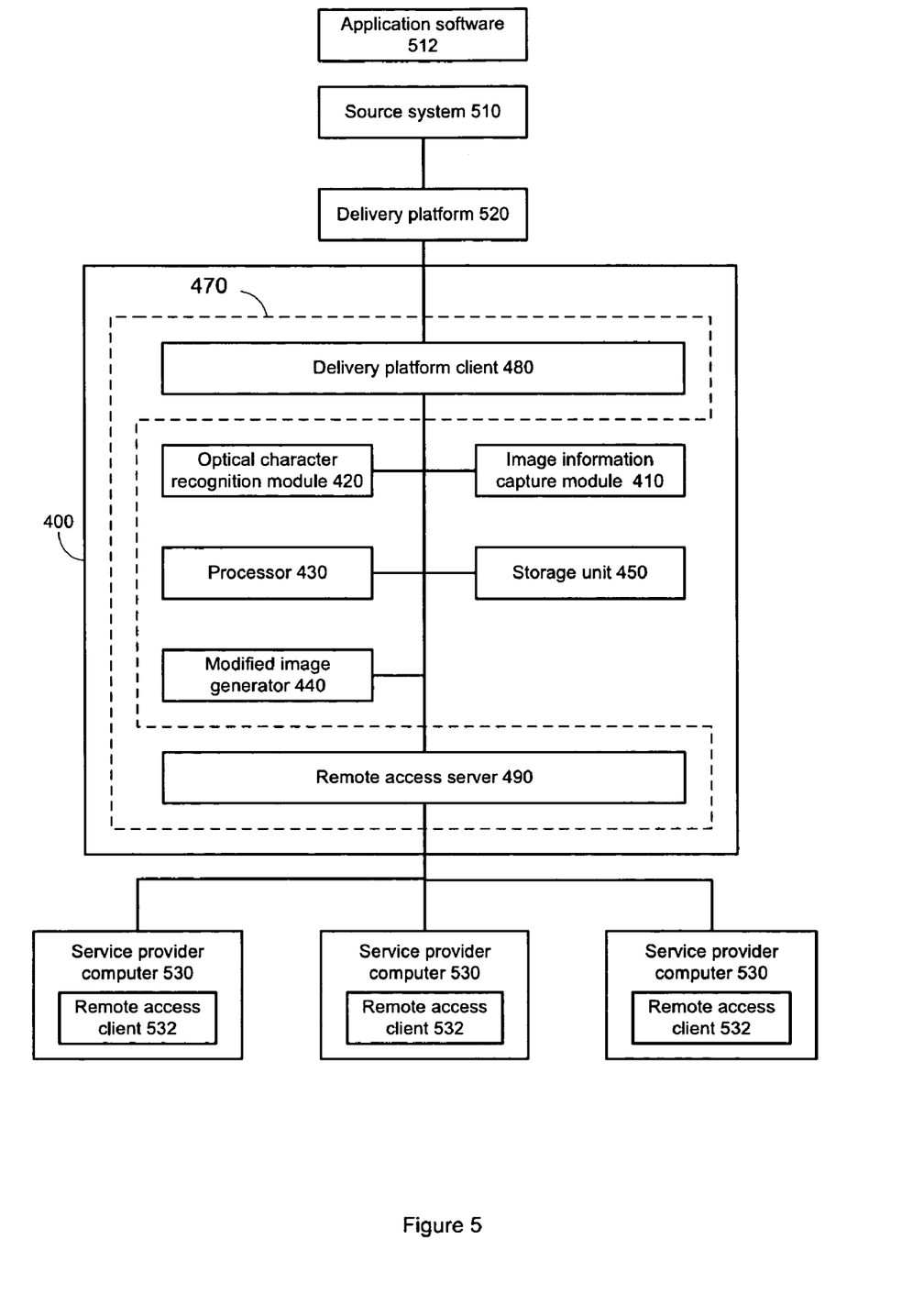
FIG. 5 illustrates a system and its environment according to an embodiment of the invention.

FIG. 5 illustrates system 400 and its environment, according to an embodiment of the invention.

System 400 is connected between target systems such as service provider computer 530 and delivery platform 520 that is connected to a source system 510 that executes software application 512.

Application software 512 is executed on source system 510 and it can exchange information, using delivery platform 520, with service provider computer 530. The information includes image information that is modified by system 400. System 400 can extend the delivery platform. It captures image information from source system 510, process it and modify it.

Service provider computers 530 can be manned by customer service representatives that receive modified images and acting upon them, while application software can be executed in a remote site.

System 400 can include a differential image unit adapted to identity the difference between image information of a previously received image and of a current image. The difference can be then sent to OCR module 480. Alternatively, differential image information can be sent to system by source system 510 and, additionally or alternatively, by delivery platform 520.

The image information can represent an image of one or more portions of a page, a form or another entity. These one or more portions can reflect a difference between a current image and a previous image.

Image information can be generated by or transmitted in a differential manner by a source system or by a delivery platform. Alternatively, a system that receives image information that represents an entire page, form or other entity, can determine the difference between a current image and a previous image.

Furthermore, the invention can take the form of a computer program product accessible from a tangible computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device.

The tangible medium can be read by applying electronic, magnetic, optical, electromagnetic, infrared techniques, and can be a semiconductor system (or apparatus or device). Examples of a tangible computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A computer program product is provided. It includes a tangible computer usable medium including a computer readable program, wherein the computer readable program when executed on a computer (such as, but not limited to, the storage controller) causes the computer to: capture image information representative of an image that includes images of textual characters; recognize the textual characters by applying Optical Character Recognition; identifying the layout of the image and apply at least one de-identification process on textual characters of interest to provide de-identification process results.

The tangible computer usable medium includes a computer readable program, wherein the computer readable program when executed on a computer (such as but not limited to the storage controller) causes the computer to execute any stage of method 100 and any combination thereof.

A computer program product is provided. It includes a tangible computer readable medium including a computer readable program, wherein the computer readable program when executed on a computer causes the computer to: capture image information representative of an image that comprises images of textual characters; recognize the textual characters; find textual characters of interest; apply multiple de-identification processes on the textual characters of interest; and generate modified image information representative of a modified image that includes images of the de-identification process results instead images of the textual characters of interest. At least one de-identification process can include performing a random operation.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for manipulating an image, the method comprising:
    capturing image information by interception thereof during transmission by a source system to a target system, the image information being representative of an image that includes images of textual characters;
    recognizing the textual characters by applying Optical Character Recognition;
    using a computer processor to automatically analyze the image to identify a layout of the image by identifying associations among strings of the textual characters with graphical features, the features including tables, table rows and labels of text areas, and to identify textual characters of interest from the associations, wherein identifying associations comprises applying context-based rules and content-based rules to the strings;
    applying at least one de-identification process on the textual characters of interest by replacing at least a portion of the textual characters of interest with different textual characters to provide de-identification process results; and
    transmitting the de-identification process results for display on a screen of the target system.

2. The method according to claim 1 comprising applying a masking process on at least one textual character of interest and applying another de-identification process on at least one other textual character of interest.

3. The method according to claim 2 wherein the other de-identification process is selected from: repeatable scrambling;
    randomly replacing textual characters;
    scrambling textual characters;
    scrambling textual characters while preserving a format of textual character strings;
    scrambling at least one textual character of a textual character string while maintaining at least one textual character of the textual character string; and
    applying a random function.

4. The method according to claim 3 comprising applying a masking process on at least one textual character of interest, applying another de-identification process on at least one other textual character of interest, and applying a further de-identification process on at least one textual character of interest.

5. The method according to claim 2 wherein the image is a synthetic image that is generated by application software.

6. The method according to claim 1 comprising executing the stages of capturing, identifying recognizing, analyzing, applying and transmitting in real time;
    wherein the image information represents a difference between a previous image and a current image;
    generating modified image information representative of a modified image that comprises images of the de-identification process results instead of images of the textual characters of interest; and transmitting the modified image as the de-identification process results.

7. A system having image manipulating capabilities, the system comprising:
an image information capture module adapted to capture image information by interception thereof during transmission by a source system to a target system, the image information being representative of an image that comprises images of textual characters;
an optical character recognition module, adapted to recognize the textual characters;
a processor, adapted to automatically analyze the image to determine an image layout by identifying associations among strings of the textual characters with graphical features, the features including tables, table rows and labels of text areas, and to identify textual characters of interest from the associations, wherein identifying associations comprises applying context-based rules and content-based rules to the strings, the processor operative to apply at least one deidentification process on the textual characters of interest by replacing at least a portion of the textual characters of interest with different textual characters to provide de-identification process results; and
a modified image generator, adapted to generate modified image information that represents a modified image that comprises images of the de-identification process results instead of images of the textual characters of interest, wherein the processor is operative to transmit the de-identification process results for display on a screen of the target system.

8. The system according to claim 7 wherein the processor is adapted to apply a masking process on at least one textual character of interest and apply another de-identification process on at least one other textual character of interest.

9. The system according to claim 8 wherein the other de-identification process is selected from: repeatable scrambling;
randomly replacing textual characters;
scrambling textual characters;
scrambling textual characters while preserving a format of textual character strings;
scrambling at least one textual character of a textual character string while maintaining at least one textual character of the textual character string; and
applying a random function.

10. The system according to claim 8 wherein the processor is adapted to apply a masking process on at least one textual character of interest, apply another de-identification process on at least one other textual character of interest, and apply a further de-identification process on at least one textual character of interest.

11. The system according to claim 7 wherein the image is a synthetic image that is generated by application software.

12. The system according to claim 7 wherein the optical character recognition module is adapted to recognize in real time the textual characters;
the processor is adapted to determine in real time the image layout, and apply in real time at least one de-identification process on textual characters of interest to provide de-identification process results; and
the modified image generator is adapted to generate in real time the modified image information and wherein the system is adapted to transmit the modified image information to at least one target system.

13. A computer program product comprising a non-transitory computer usable medium including a computer readable program, wherein the computer readable program when executed on a computer causes the computer to perform the steps of:
capturing image information by interception thereof during transmission by a source system to a target system, the image information being representative of an image that includes images of textual characters;
recognizing the textual characters by applying Optical Character Recognition;
automatically analyzing the image to identify a layout of the image by identifying associations among strings of the textual characters with graphical features, the features including tables, table rows and labels of text areas, and to identify textual characters of interest from the associations, wherein identifying associations comprises applying context-based rules and content-based rules to the strings;
applying at least one de-identification process on the textual characters of interest by replacing at least a portion of the textual characters of interest with different textual characters to provide de-identification process results; and
transmitting the de-identification process results for display on a screen of the target system.

14. The computer program product according to claim 13, wherein the computer readable program further causes the computer to apply a masking process on at least one textual character of interest and applying another de-identification process on at least one other textual character of interest.

15. The computer program product according to claim 14, wherein the other de-identification process is selected from:
repeatable scrambling;
randomly replacing textual characters;
scrambling textual characters;
scrambling textual characters while preserving a format of textual character strings;
scrambling at least one textual character of a textual character string while maintaining at least one textual character of the textual character string; and
applying a random function.

16. The computer program product according to claim 13, wherein the computer readable program further causes the computer to apply a masking process on at least one textual character of interest, applying another de-identification process on at least one other textual character of interest, and apply a further de-identification process on at least one textual character of interest.

17. The computer program product according to claim 14 wherein the image is a synthetic image that is generated by application software.

18. The computer program product according to claim 13 comprising executing the stages of capturing, recognizing, analyzing and applying and transmitting in real time;
wherein the image information represents a difference between a previous image and a current image;
generating modified image information representative of a modified image that comprises images of the de-identification process results instead of images of the textual characters of interest; and
transmitting the modified image as the de-identification process results.

* * * * *